Dec. 7, 1926.  1,609,410
H. KARL
SUBSTITUTE SUPPORT DEVICE FOR VEHICLES
Filed August 23, 1921   2 Sheets-Sheet 2
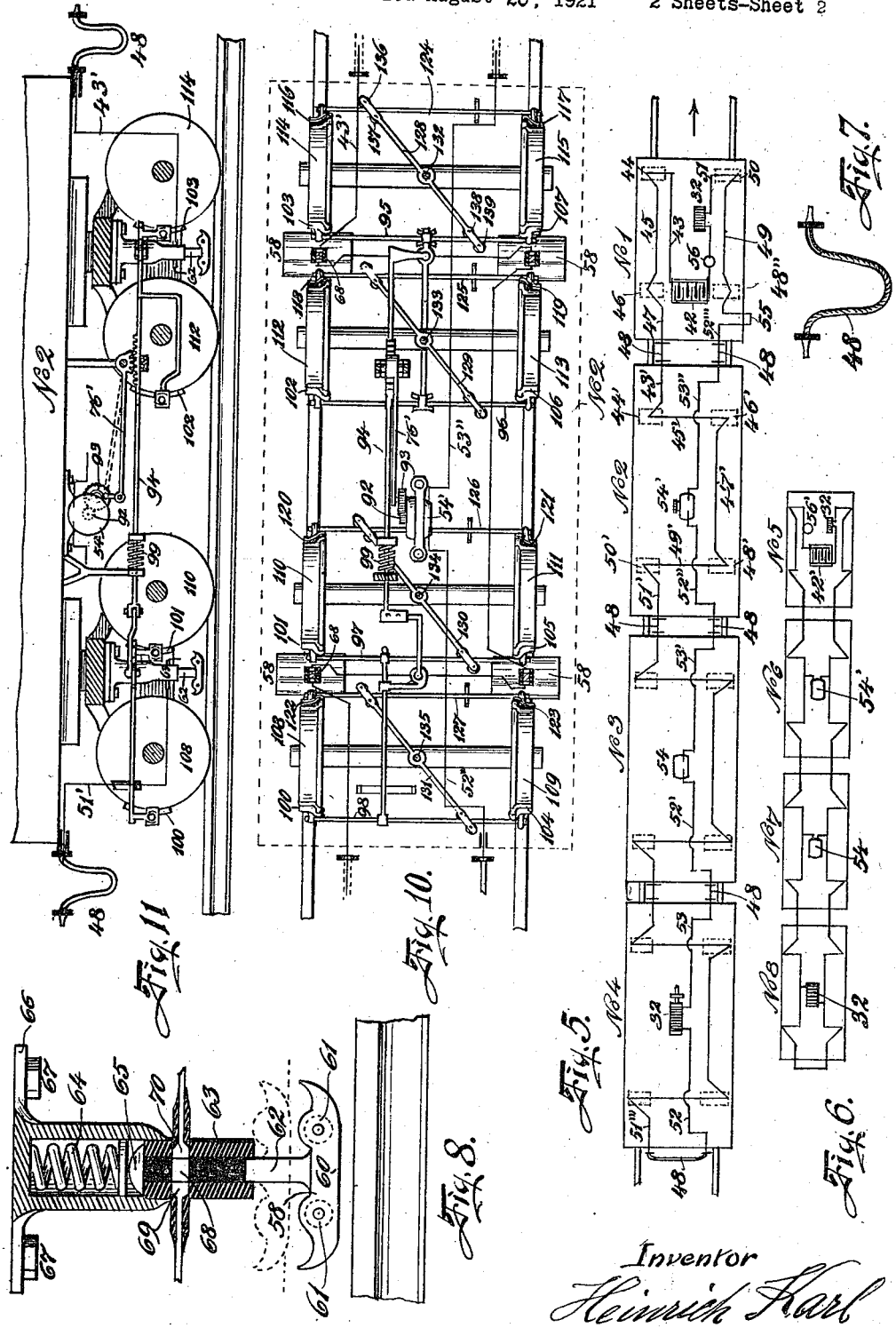

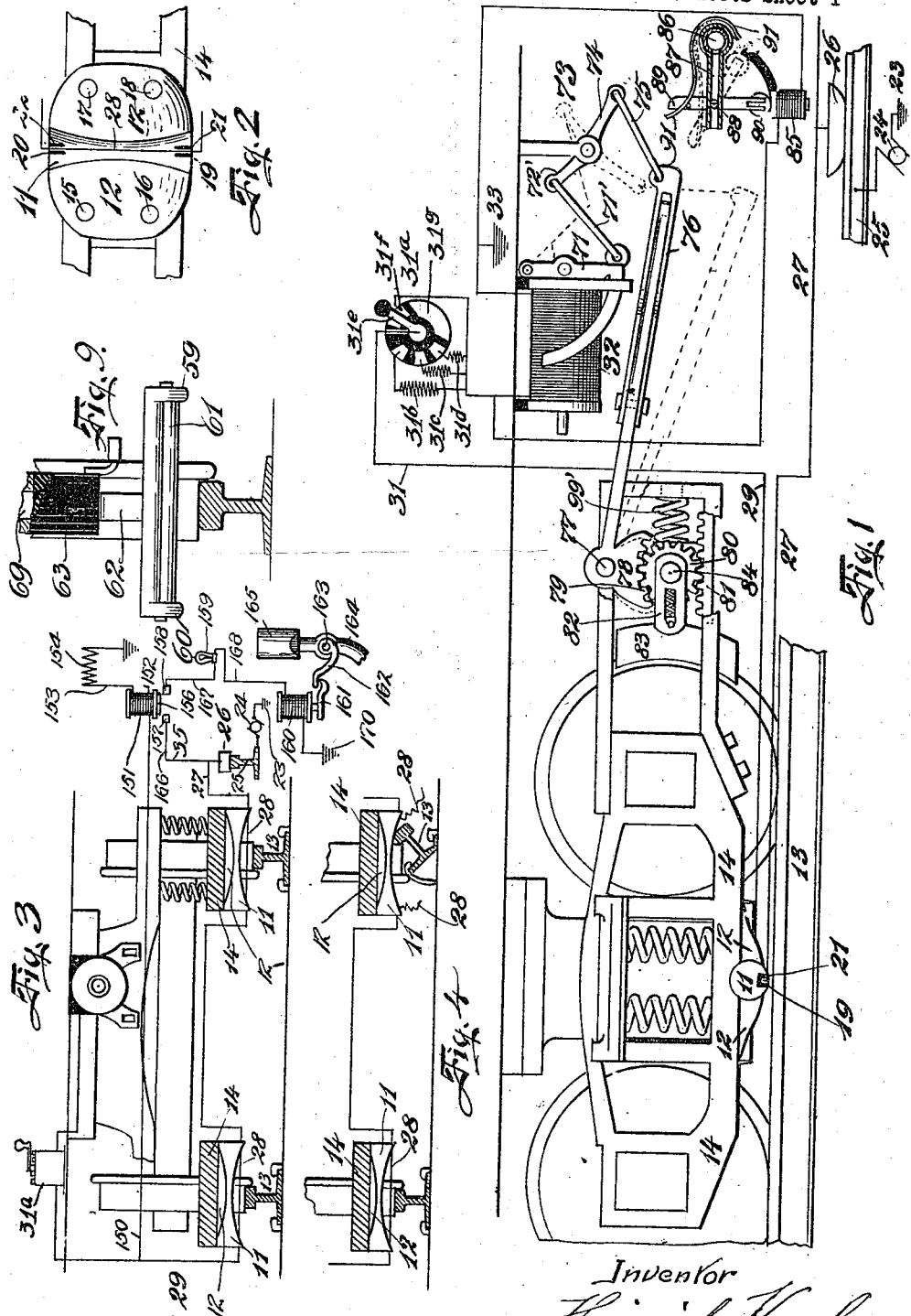

Patented Dec. 7, 1926.

1,609,410

UNITED STATES PATENT OFFICE.

HEINRICH KARL, OF JERSEY CITY, NEW JERSEY.

SUBSTITUTE SUPPORT DEVICE FOR VEHICLES.

Application filed August 23, 1921. Serial No. 494,677.

This invention relates more particularly to arrangements on railroad vehicles or trains on which substitute support devices are employed, which devices form the support for the vehicle in lieu of the derailed wheels. In particular these substitute support devices belong to that kind which cause the application of the train brakes when they become the substitute support of the vehicle. While in similar inventions of others a special brake control circuit is employed that in most cases is unsafe because it is designed as a normally open circuit, I employ a normally closed circuit, connect it to all the substitute support devices of the train and create in so far an economical arrangement therewith because I use this same circuit for voluntarily controlling the brakes by means of the engineer's or motorman's brake switch.

As another novel feature I cite the particular form of one of the modifications of the substitute support devices which permits the connection of an intact circuit conductor within it, and the arrangement of this normally uninterrupted conductor is made so that it will burst when a derailment happens, that is, when the substitute support device becomes the substitute support. This arrangement is in so far adaptable because the circuit which, in this instance, is a normally closed one will not be opened under normal conditions of the train despite the heavy shocks to which each substitute support device is submitted when the train is moving, while the contrary may likely happen when electric contact parts are employed in the circuit connections that are arranged within the substitute support devices. The possibility of failure is still more at hand in connection with a normally open circuit where no closure of the circuit will take place when dust or other matter, as, for instance, oil settles between the contacts.

Another novel feature of this invention is the arrangement of a circuit that controls alarm and signalling devices whereby the engineer will know instantly the cause of the stopping of the train and can take his precautions.

In the accompanying drawings in which like reference characters indicate like parts, the Fig. 1 shows in elevation, part of the track-rails of an electrified line and a side-view of a truck of a railroad-vehicle that travels thereon; this vehicle is equipped with the substitute support device which includes the conductor of a circuit of an electric brake and of an electro-magnetic venting device of the airbrake system; parts of a manual control device are also shown.

Fig. 2 is a bottom view of the substitute support device of Fig. 1.

Fig. 3 is a sectional front view of the railroad car truck of Fig. 1 showing two of the substitute support devices in normal position and in a view different from that of Figs. 1 and 2.

Fig. 4 shows the substitute support devices of Fig. 3 whereby however one of the truckwheels is derailed on account of a spread rail, so that one of the substitute support devices forms the substitute support for the vehicle in lieu of the derailed wheel whereby also the circuit conductor or part thereof that is arranged within said last mentioned substitute support device is cut or burst.

Fig. 5 is a diagrammatic representation of a circuit on a train with several cars or coaches, whereby the brake operating devices that are included in this circuit are represented as electric motors or electro-magnets.

Fig. 6 shows an arrangement of the train circuit (brake circuit) that is different from that shown in Fig. 5.

Fig. 7 shows the means by means of which the electric train circuit connection is to be made between each train unit as well as that at the end of the train.

Fig. 8 shows, partly in section, another form of a substitute support device whereby however electric contacts are employed within for normally connecting the brake circuit.

Fig. 9 is a front view of the substitute support device of Fig. 8.

Fig. 10 shows the plan of the arrangement of the brakes of a railroad car which are operated by an electric motor; and Fig. 11 shows, in elevation, part of this car and the brake operating mechanism.

In case of a derailment the first requirement is a substitute support for the railroad vehicle for avoiding the overturning of it.

In general the substitute support device disclosed in this invention shows the chief characteristics of the similar devices invented before by others, namely that it extends laterally over the vertical plane of the wheel or rail and normally does not touch the rails with which however it comes into contact when the wheels next to this device derail.

The substitute support device as illustrated in Figs. 1, 2, 3 and 4 shows a roller 11 which has a smaller diameter in its center than on its two ends, first for the purpose to prevent the roller 11 from sliding off the rail in case of a derailment and secondly to permit an electric conductor to be stretched from one end of the roller to the opposite end thereof, in a manner that it will not touch the center part of the roller. This roller 11 is held by a plate 12 in a manner that it must come into contact with the rail above which it is positioned when the wheels next to this device derail; the plate 12 is therefore not so near to the track rail than the roller 11. In order to keep the lowermost part of the roller 11 completely free from the plate 12 the roller 11 is held only by a portion of the plate 12 that embraces about three quarters of the rounded surface of the roller so that it is prevented from falling when the plate 12 is secured to the underside of the portion of the wheel frame that is situated between two of the wheels that contact with the same track rail such as best illustrated in Figs. 1, 3 and 4. The plate 12 as shown in Fig. 1, is preferably made of two pieces of which one piece is situated on the left and the other piece on the right side of the roller 12. In any event, however, that is also when the plate 12 is made of one single piece the portion of the plate 12 that holds the roller shall not exert such pressure upon it that it will be prevented from rolling when it comes into contact with the track rail at the occurrence of a derailment of the wheels situated next to this device. The plate 12 is secured to the wheel-frame by means of screws 15, 16, 17, 18, but it is as well possible to use other means therefor, as, for instance steel bands. In Fig. 4 is shown that the right side rail is spread and consequently the wheels that rolled along this rail derailed inwardly. It is evident that the substitute support device will also form the substitute support when the wheels derail outwardly, which happens when the rail is bent inwardly in which event the wheels will first ride with their flanges on the rail before slipping off outwardly. In this case the wheels on the opposite rail will also derail but inwardly. Referring to the electric connections the conductor that is stretched from one end of the roller 11 to the other end thereof is firmly held in pinches 19, 20 especially made for this purpose. If then a derailment happens the roller 11 will roll along the rail and the wire that is stretched from pinch 19 to pinch 20 will be cut by the edge of the pinches or will burst (see Fig. 4) and thereby will open the electric circuit that normally is closed.

This electric circuit will be traced subsequently. Electric insulations 21, 22 must be provided for on the roller 11 for preventing shortcircuit; or the whole roller 11 may be made of electricity insulating material.

For establishing again the electric circuit after the part of the conductor is cut or broken that was arranged within the substitute support device that became the substitute support at the occurrence of a derailment, it simply will be necessary to press a readily held piece of wire into the pinches 19 and 20 and unite the ends of this wire with the respective ends of the interrupted conductor.

In Fig. 1 part of an electric circuit is shown that serves for the propulsion of trains and another one that includes the same source of power, namely the generator 24, is utilized for energizing the brake operating devices, such as the electro-magnets 32 and 85 of which the former belongs to an electric brake while the latter forms part of an electro-magnetic venting device of the air brake system. For sake of simplification there is in Fig. 1 only one of the substitute support devices connected in the brake circuit. The circuit connections as shown in Fig. 1 then are as follows: ground 23, generator 24, third rail 25, shoe 26, wire 27, wire 28 (which however is not a special wire except when said readily held piece is used for replacing this wire after it broke at the occurrence of a derailment) wire 29, the manual brake control switch 31ª in the engineer's cab, electro-magnet 32 and ground 33.

The brake control switch 31ª is provided with all the necessities for controlling the brakes in a successful manner and therefore possesses electric connections with resistances 31ᵇ, 31ᶜ, 31ᵈ that are arranged in series so that at the placing of the switch part 31ᵉ to the contact that is in connection with the resistance 31ᵇ or 31ᶜ or 31ᵈ, respectively, a stronger or weaker energization of the electric devices 32 and 85 (see Fig. 1) will be obtained. If the switch part 31ᵉ will be connected with the contact part 31ᶠ, no resistance is then cut in the circuit and therefore the electro-magnets 32 and 85 will be fully energized which means also a complete retraction of the brakes while a full application of them is obtained when the switch part 31ᵉ contacts with the field 31ᵍ that has no connection with the train circuit in which the substitute support devices are included. It is also apparent that there is in so far also a cooperation between the substitute support devices and the manual switch device 31ª because these devices permit the use of a continuous intact conductor and consequently a safe voluntary braking. It is hereby shown that a circuit is created in which the current is utilized in an economical way to serve in connection with the substitute support devices as well as with the voluntary operation of the brakes.

It will be noted that the last traced circuit serves for an electrically propelled train, while a steam propelled train may have the electric circuit connections of the brake circuit as shown in Figs. 5 or 6. The brake circuit that includes the substitute support devices must be extended over the whole train in a similar way as shown in Fig. 5 or Fig. 6. If there is an air-brake system employed on the train then only one of the electro-magnetic venting devices is necessary as illustrated in Fig. 1 and the electro-magnet thereof should be included in the brake-circuit in which also all the substitute support devices of the train are included.

If however electric brakes are employed on the train then the brake-operating devices, of which at least one is employed on every train unit, should be included in the brake-circuit.

The brake operating devices may partly consist of an electro-magnet 32 or an electric motor 54 or 54' such as indicated in Figs. 5 and 6, and these devices if sufficiently energized hold the brakes in retracted position in the same or similar manner as illustrated in Fig. 1 of which a more detailed description will follow subsequently.

The circuit shown in Fig. 5 is traced as follows: Storage battery 42, wire 43, the first substitute support device that is indicated by 44 and situated on the train unit No. 1, wire 45, the next substitute support device 46, wire 47, circuit connecting part 48, wire 43' on the train unit No. 2, substitute support device 44', wire 45' substitute support device 46', wire 47', substitute support device 48', wire 49', substitute support device 50', wire 51', circuit connecting part 48, then follow the circuit connections on the train units No. 3 and No. 4 all of which are not enumerated here because it would be simply a repetition of the conductor arrangement as traced in connection with the train unit No. 2. At the end of the train a circuit connecting part 48 is employed that connects the wire 51''' with the wire 52 and this wire 52 is also connected to the brake-operating device 32 of train unit No. 4, then follows the wire 53, circuit connecting part 48, wire 52'', electric motor 54', wire 53'', circuit connecting part 48, wire 52''' and automatic train control device indicated by 55, substitute support device 48'', wire 49, substitute support device 50, wire 51, electro-magnet 32, manual circuit-controlling device 56 and storage battery 42.

In Fig. 6 the circuit arrangement differs in so far from the arrangement of the circuit shown in Fig. 5 in that the circuit conductor that first is connected to the battery 42' is connected to all the substitute support devices on the left side of the train whereby a connection is also made between this left side circuit conductor and each brake operating device and the right side circuit conductor, that may be called the back conductor, is arranged in a similar way as the left side conductor.

Referring to Fig. 1 the electro-magnet 32 if energized attracts by means of its armature 71 and chain or rod 71' the shank 72' of the balance-scale-like part 73 whereby the other shank 74 pulls by means of the rod 75 the lever 76 which is hinged at 77. At this hinged end of the lever 76 a dentated cam 78 is formed whose teeth 79 engage with the teeth of a pinion 80, which teeth again engage with the teeth of a rack 81.

On the shaft or axle 84 of the pinion 80 a slotted part 82 is mounted which holds the brake shoe 83.

Against the shaft 84 and its bearing respectively presses the strong spring 99' whereby the pinion 80 and the part 82 press the brake shoe 83 strongly against the wheelrim if the lever 76 is not pulled up as shown by the dotted lines in Fig. 1. If however the armature 71 is attracted by the fully energized electro-magnet 32 the lever 76 is pulled to the position shown by the full lines, the cam 78 turns thereby the pinion 80 in the direction in which its shaft or bearing thereof will move against the spring and consequently exert a counter pressure with the result that the brake shoe 83 is retracted from the wheelrim.

For obtaining pressure grades that are weaker than the strongest application of the brake shoes a second spring is employed that is arranged in the slot of the part 82; this spring exerts still some pressure upon the brake shoe and presses it more or less strongly against the wheelrim when the electro-magnet 32 is only partially energized.

This is only one example of an electric brake and I believe that its description is sufficient for comprehending the cooperation thereof with the substitute support device. It is thus so far shown that a strong application of the brakes will take place whenever the brake-circuit that includes the electric conductors that are stretched from one end of the roller 11 to the opposite end thereof will be interrupted.

In the case however where certain units of the train or all of it are equipped with the air brake an electro-magnetically operated venting device is introduced in this invention and by means of this device an application of the train brakes will be obtained also when the brake circuit will be interrupted.

This device consists partly of an electromagnet 85 which is electrically connected with the brake-circuit shown in Fig. 1 but it may as well be introduced in the circuits shown in Figs. 5 and 6 if air brakes should be used instead of electric brakes.

To the train-pipe 86 is joined the exhaust pipe 87 which is controlled by a valve 88 that is seated in it.

This valve normally closes the exhaust pipe 87. To the valve 88 is connected the lever 89 which is provided with a roller 90 on its one end. A spring 91 of any suitable kind is arranged to press against the upper end of the lever 89 and always tends to push the upper end of this lever in the direction in which the valve 88 would open the exhaust pipe 87. The roller 90 however which will be attracted by the energized electromagnet 85 moves thereby the lever 89 in the position in which the valve will completely or partly close the exhaust pipe 87. If therefore the electro-magnet 85 is de-energized owing to an interruption of the brake circuit, if, for instance one, or some, or all of the substitute support devices become substitute supports of the vehicles, the compressed air from the train pipe will escape and will cause the application of all train-brakes as anyone skilled in the art knows.

In Fig. 3 is shown how the circuit can be arranged that controls the means used for sounding an alarm and for giving a signal that is to call the attention of the engineer, that an automatic application of the brakes takes place, resulting from a derailment.

This circuit which is designed as a normally open one is as follows: Ground 23, generator 24, third rail 25, shoe 26, wire 35, wire 166, contact 157 of the relay 152 which as shown in the drawing attracts its armature and therefore keeps this circuit open as long as the brake circuit is closed, contact 158, wire 167, bulb 159, wire 168, winding of solenoid 160, and ground 170.

The circuit that includes the solenoid winding 151 of the relay 152 is as follows: Ground 23, generator 24, third rail 25, shoe 26, wire 27, wire 28, connecting wire from the right side substitute support device to the left side substitute support device, wire 28 of the left side substitute support device, wire 29, wire 150; then follows the winding 151, wire 153, resistance 154 which then is grounded.

From the arrangement of this last traced circuit it is shown, that the bulb 159 will be lighted only when an interruption of the last traced circuit occurs. It is thus apparent that when only an automatic control happens, a closure of the alarm and signal circuit will not take place; the engineer then will know that no derailment happened and that the cause of the automatic braking is due to another cause.

The scheme for sounding an alarm through the closure of the circuit that includes the solenoid winding 160 is as follows: When the armature 161 is attracted by the energized solenoid 160, the lever 162 of a valve 163 will be engaged by an extension of the armature 161, whereby this valve will open an exhaust pipe on whose end is suitably arranged a whistle 165 which then will be blown by the outrushing compressed air or steam if such is employed on the train.

The substitute support device shown by Figs. 8 and 9 differs in so far from the other one illustrated by Figs. 1, 2, 3 and 4 by that the interruption of the train circuit just traced will not be obtained by the bursting of a part of the conductor, but by causing a disconnection of electrical contacts through the upward shifting of one of the contact parts of this substitute support device at the occurrence of a derailment.

The constructive parts of this device of Figs. 8 and 9 are the following. The part which is indicated by 58 is the nearest to the rail and at the occurrence of a derailment of those wheels between which this device is arranged, this part 58 will come into contact with the railhead. This part 58 may be formed as a flat plate having flanking downwardly extending flanges 59, 60. A roller 61 or two of them may be so arranged that the flanges 59, 60 form also the bearings for the rollers. The rollers will facilitate the sliding on the rail at the occurrence of a derailment and the flanges 59, 60 serve to prevent the device from sliding off the rail when it rolls or slides along on it. A vertical angular stem 62 is united with the part 58 and is held by the enveloping part 63. On its upper end the stem 62 has a head-piece 65 so arranged as to hinder the stem 62 and part 58 etc. from sinking down further than would be practical and also for the purpose to hold the electrical contact 68 of the stem 62 in register with the contacts 69 and 70 of the part 63 to close the train circuit. From the drawing it will be seen that the circuit will be interrupted if the stem 62 is pushed sufficiently upward, whereby the contact part 68 goes out of contact with the contacts 69 and 70. The stem 62 with the exception of the contact part 68 and the part 63 with the exception of the contact parts 69 and 70 may be made of an electricity insulating material. The upper extension of 63 is hollow and contains a relatively strong spring 64, which serves to soften the shock which is happening at the brusk upward pressure of the parts 58, 62 and therewith of 65, as it may happen when these parts are forced to be the substitute support at a derailment of the wheels. In this case the head 65 is pressing against the spring 64. The part 63 has several extensions 66 which serve for the fastening of the whole device to the wheel frame by means of screws 67 etc.

A modification of the electric brake is shown by Figs. 10 and 11. The main difference between this arrangement and that shown by Fig. 1 consists of the use of an electric motor instead of an electro-magnet, but an electro-magnet could as well serve in this case.

The transmission mechanism used with electric motors is to be somewhat different from that of electro-magnets, since there is a revolving motion compared with the more or less shifting (reciprocating) motion of the armature of an electro-magnet. I therefore arrange one or several cogwheels 92, 93 etc., of which one (93) has a rod linked near its circumference and at its other end this rod is linked to the lever 76' which is similar to 76 of Fig. 1. Between the system of Fig. 1 and the system of Figs. 10 and 11 there exists a difference also in so far as the lever 76' does not operate a pinion, but is so arranged that the teeth on its cam engage with the teeth provided for on a rod 94, which is connected to the brake shafts 95, 96, 97 and 98. A strong spring 99 is so arranged that it will press the rod 94 always to the right according to the views shown in the drawings. The shafts 95, 96, 97 and 98 will then be pressed also to the right, whereby the brake shoes 100, 101, 102, 103, 104, 105, 106 and 107, which are held by these shafts will be pressed against the wheel circumference and exercise the pressure for braking the train, (Fig. 11). If it is desired to employ more brake shoes (Fig. 10) simply such known arrangements have to be made, which cause the brake shoes 116, 117, 118, 119, 120, 121, 122 and 123 to be pressed to the left when the other brake drags are pressed to the right, so that the wheels 108, 109, 110, 111, 112, 113, 114 and 115 will be braked simultaneously by all brake shoes. In Fig. 10 the brake drags 116, 117, 118, 119, 120, 121, 122 and 123 are arranged on their respective shafts 124, 125, 126, 127. The rods 128, 129, 130 and 131 are forming bearings at their exact middle parts and for each bearing a vertical pin is provided for which is rigidly united with the wheel frame, the rods then can move in a certain degree around the pins, which are designated by 132, 133, 134, 135. The rod 128 has a bifurcation on each of its two ends and the rollers 136, 137, 138 and 139 are so arranged in them that the shaft 124 is held between the rollers 136 and 137, while the shaft 95 is held between the rollers 138 and 139. The rod 128 is diagonally arranged, so that it will pull the shaft 124 and thereby press the brake drags 116, 117 against the wheel circumferences of the wheels 114, 115 when the shaft 95 is pushed to the right, whereby the brake drags 103, 107 are pushed against the circumferences of the wheels 114, 115; the rod 128 is then partly turned around its vertical shaft pin 132 with the tendency to get into the same direction as that of the wheel axle, while for the retraction of the brake shoes 116, 117 the rod 128 must be pulled into the opposite direction.

The rollers 136, 137, 138 and 139 serve to facilitate this function.

Instead to use only these four rods 128, 129, 130 and 131 still more of them may be employed, at least four more on a car.

The arrangement as described in respect to the shafts 95, 124 is employed also with the other similar shafts of the car and therefore will not need to be described again.

I have given here only one example of a substitute support device within which a single intact brake or train circuit conductor is connected which therefore makes electrical contacts within the substitute support device avoidable, and I have shown also brake control circuits that serve at the same time for the normal operation of the train brakes which circuit is at the same time connected to each of the substitute support devices of which I show only two distinct kinds, and inasmuch as I believe that these examples suffice for making the invention comprehensible I wish to make it understood that I am aware that different circuit arrangements and different constructions of the involved devices are possible without however departing from the spirit and scope of the invention.

I claim:—

1. In a system for preventing the upsetting of the railroad-vehicle at the occurrence of a derailment of a device arranged between a pair of wheels that stand and roll on the same rail and adapted to form the substitute support when the wheels derail, a circuit in connection with devices for controlling the train brakes, a conductor of said circuit connected to said device and arranged within it, means within said device permitting said conductor to be arranged in an undivided condition so that electrical contacts are avoided, said conductor adapted to burst when said device becomes the substitute support.

2. In a system for preventing the upsetting of the railroad vehicle at the occurrence of a derailment of a substitute support device comprising a roller held by a means that is secured to the wheel frame of a railroad vehicle, and a conductor of a normally closed brake controlling circuit stretched along said roller and adapted to burst when said roller comes into contact with the rail at the occurrence of a derailment.

3. The combination in a system for preventing the upsetting of the railroad vehicle, of substitute support devices arranged on a train, a single uninterrupted and intact circuit conductor in connection with devices for controlling the train brakes and with devices adapted to signal and cause alarms, said conductor adapted to break when a substitute support device becomes the substitute support and causing thereby the application of the brakes and the signalling and alarms for calling the attention of the engineer or motorman, and a manually operable controlling device connected in circuit with said conductor permitting the voluntary control of the brakes.

4. In a system for preventing the upsetting of the railroad vehicle, of a substitute support device comprising a roller that has a smaller diameter in the center than on its two ends, pinches arranged on the end-borders of said roller and insulations arranged thereon, a continuous conductor of a circuit stretched from one of the pinches to the other one situated on the opposite end of the roller and adapted to break when said roller becomes the substitute support for the vehicle, and the pinches adapted to hold a new piece of conductor stretched when the first one broke at the occurrence of a derailment.

5. The combination in a system for preventing the upsetting of the railroad vehicle, of substitute support devices arranged on a train, a circuit for controlling the train brakes, means for interrupting said circuit and thereby automatically cause the application of the train brakes when a substitute support device becomes the substitute support for the railroad vehicle, and a manually operable switch included in said circuit to permit also the voluntary operation of the brakes at normal conditions of the train.

HEINRICH KARL.